Patented Feb. 14, 1950

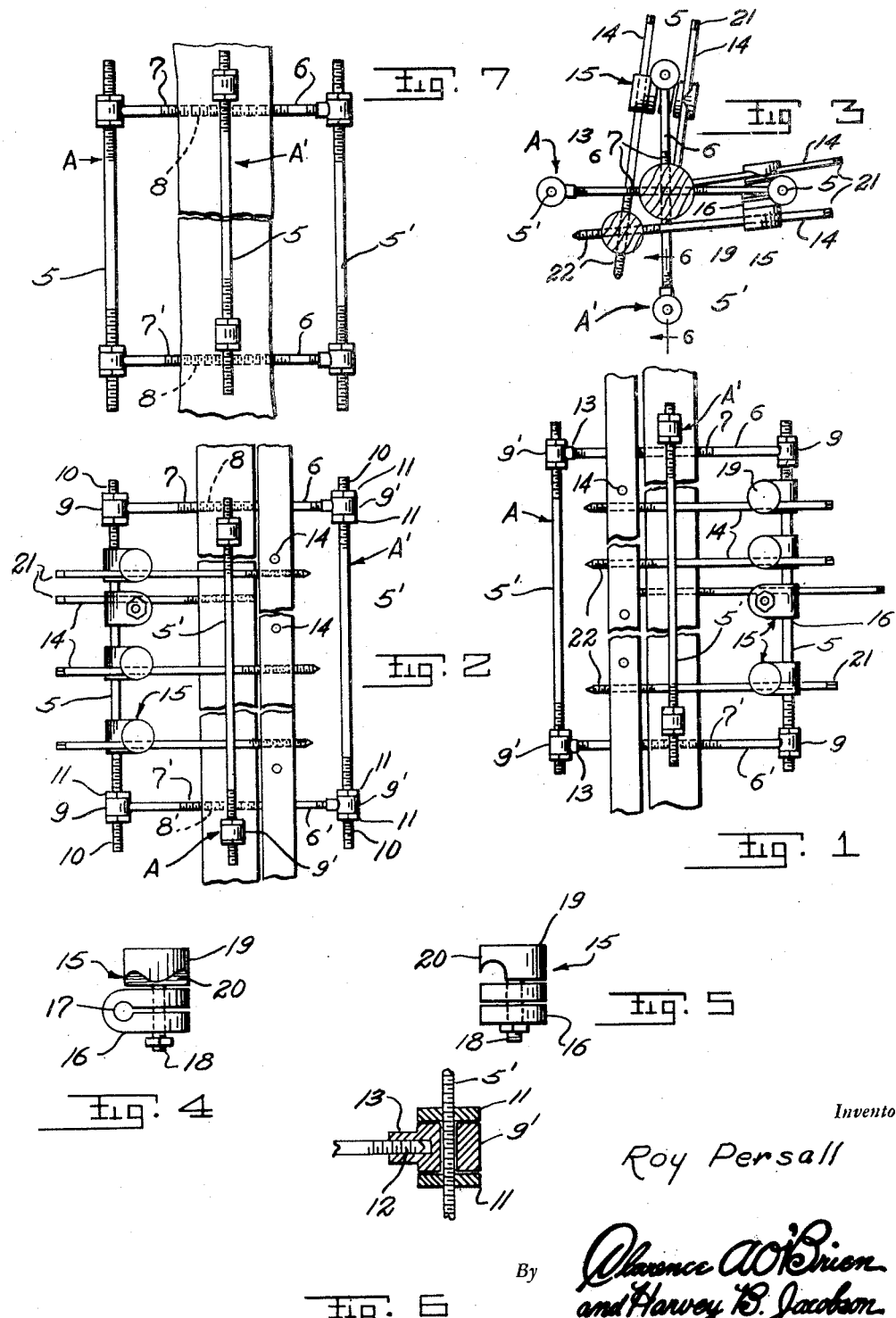

2,497,626

UNITED STATES PATENT OFFICE 2,497,626

SURGICAL SPLINT

Roy Persall, Morton, Wash.

Application November 9, 1945, Serial No. 627,599

2 Claims. (Cl. 128—92)

This invention relates to surgical splints, and the primary object of the invention is to provide an improved device of this kind which may be effectively employed in connection with single or double fractures of one or two bones.

A further object of the invention is to provide a surgical splint of the above character which is comparatively simple in construction, easy to use, and highly efficient for the intended purpose.

The exact nature of the present invention, as well as more specific objects and features thereof, will become apparent from the following description when considered in connection with the accompanying drawing, in which:

Figure 1 is an elevational view of a surgical splint constructed in accordance with the present invention and illustrated in use for holding the sections of two bones in proper relation while mending when the bones are provided with double fractures.

Figure 2 is a similar view looking toward the right of Figure 1.

Figure 3 is an end view looking downwardly at Figure 1.

Figure 4 is an enlarged elevational view of one of the clamps for adjustably and removably mounting the secondary bone piercing rods on a carrier rod of each splint unit.

Figure 5 is a view looking toward the left of Figure 4.

Figure 6 is an enlarged fragmentary section taken on line 6—6 of Figure 3.

Figure 7 is an elevational view of a modification of the surgical splint for use in connection with a single fracture of one bone and in which the secondary bone piercing rods are omitted.

Referring in detail to the drawings, the present surgical splint comprises a pair of similar splint units A and A' adapted to be disposed in crossed relation substantially at right angles to each other when in use. Each splint unit is in the form of a rectangular rod assembly composed of a pair of spaced longitudinal carrier rods 5 and 5', and a pair of transverse bone piercing rods 6 and 6' connecting the carrier rods and adjustable longitudinally of the latter. The bone piercing rods 6 and 6' are adapted to pass through the broken bone at opposite sides of the break or breaks and have means to fix the same against longitudinal movement relative to the bone pierced thereby. For the latter purpose, the rods 6 and 6' preferably have their intermediate portions threaded as at 7 and 7' for threaded engagement in holes drilled transversely through the bone as at 8 and 8'. Means is provided to secure the bone piercing rods in adjusted positions relative to the carrier rods 5 and 5' and to prevent pivotal movement of the bone piercing rods relative to the carrier rods about the axes of the latter. For the last mentioned purpose, each bone piercing rod has eye members 9 and 9' on the opposite ends thereof which are respectively slidable on the carrier rods 5 and 5', and said carrier rods 5 and 5' have threaded end portions 10 on which jamb nuts 11 are adjustably threaded, one jamb nut being disposed at each side of each of the eye members 9 and 9'. It will thus be seen that by adjusting the nuts 11 away from the eye members, the bone piercing rods may be adjusted longitudinally of the carrier rods 5 and 5', whereupon the nuts 11 may be tightened against opposite sides of the eye members 9 and 9' to secure the bone piercing rods in adjusted position and against the pivotal movement referred to above. The eye member 9' of each bone piercing rod is detachable, an end 12 of the rod 6 or 6' being threaded for removable threaded engagement in a socket member 13 of said eye members 9' as shown clearly in Figure 6. Thus, in practice, the bone piercing rods 7 and 7' may be passed through the bone and threaded into its associated eye member 9' before assembly of the bone piercing rods on the carrier rods 5. Conversely, after removal of the carrier rods 5 from the bone piercing rods 6 and 6', the latter may be rotated to detach them from the eye members 9' and to remove them from the bone. By thus passing two bone piercing rods through each bone section and at right angles to each other, adjacent bone sections are positively prevented from any relative movement and thereby effectively maintained in proper relation while mending.

Thus far described, a splint is had which is suitable for use in connection with a single fracture of one bone as shown in Figure 7. However, the splint is adapted for use in connection with double fractures by the addition of secondary bone piercing rods 14. In Figures 1 to 3 inclusive, additional ones of said secondary bone piercing rods are provided so as to adapt the splint for use in connection with a double fracture of two adjacent bones. For this purpose, an additional secondary bone piercing rod is provided for each bone section, those for different sections of each bone being mounted on the carrier rods 5 of both splint units. Sufficient secondary bone piercing rods are provided so that bone piercing rods are provided for each bone section which pass through the latter at right angles to each other, thereby preventing any possible relative movement of the bone sections while mending.

The secondary bone piercing rods 14 are preferably mounted on the carrier rods 5 by providing a clamp for each of said rods of the form more clearly shown in Figures 4 and 5 and generally indicated at 15. As shown, each clamp 15 includes a split clamp member 16 formed at 17 to embrace the associated carrier rod 5 and adapted to have the jaws thereof drawn together by a nutted clamping bolt 18 which passes through said jaws, so as to securely fix the clamps against any movement relative to the carrier rod when set in the desired adjusted position. The clamping bolt 18 of each clamp has an enlarged head 19 provided at one side with an overhanging undercut jaw 20, and an end portion of a secondary bone piercing rod is adapted to be clamped between a jaw of the clamp member 16 and the jaw 20 of the head 19 so that the rod 14 is securely held in position at right angles to the associated carrier rod 5. At the end adjacent the clamp 15, the rod 14 preferably has a squared end 21 to facilitate rotation of said rod for threading its other end into and through the bone section, by the use of a suitable key or wrench and when the jaw 20 is loosened with respect to said rod 14. Said other end of rod 14 is threaded at 22 to provide for threading of the same into and through the bone where an opening has been drilled transversely through the latter. Obviously, by tightening the clamp member 16 and securely clamping the rod 14 between the jaw 20 and the adjacent jaw of clamp member 16, the secondary bone piercing rod may be firmly secured against longitudinal movement with respect to the carrier rod and against pivotal movement relative to the carrier rod about the axis of the latter. Obviously, the number and position of the respective secondary bone piercing rods will depend entirely upon the number of breaks or fractures in the bones and the relative positions of said breaks or fractures.

From the foregoing description, it is believed that the construction, operation and advantages of the present invention will be readily understood and appreciated by those skilled in the art. It will be apparent that the invention provides a very efficient splint in which all sections of a bone or adjacent bones may be positively held against relative movement and in absolutely correct relationship while being mended. The device is comparatively simple and easy to use, and it is susceptible of many modifications and changes in detail of construction such as fall within the spirit and scope of the invention as claimed.

Also, it will be apparent that the device is adapted for use in cases involving fractures of the arm above or below the elbow and of the leg above and below the knee.

What I claim is:

1. A surgical splint comprising a pair of similar splint units adapted to be disposed in crossed relation substantially at right angles to each other when in use, each unit being in the form of a rectangular rod assembly composed of a pair of spaced straight longitudinal carrier rods and a pair of straight transverse bone piercing rods, and eye members on the opposite ends of said bone-piercing rods slidable on and adjustable longitudinally of the end portions of the carrier rods, said bone piercing rods being adapted to pass through a broken bone at opposite sides of the break and having threaded intermediate portions for threaded engagement with the bone to fix said bone piercing rod against longitudinal movement transversely of the bone pierced thereby, and means to secure said bone piercing rods in adjusted positions, the carrier and bone piercing rods of each assembly being in the same plane.

2. A surgical splint comprising a pair of similar splint units adapted to be disposed in crossed relation substantially at right angles to each other when in use, each unit being in the form of a rectangular rod assembly composed of a pair of spaced straight longitudinal carrier rods, a pair of straight transverse bone piercing rods, and eye members on the opposite ends of said bone-piercing rods slidable on and adjustable longitudinally of the end portions of the carrier rods, said bone piercing rods being adapted to pass through a broken bone at opposite sides of the break and having means intermediate their ends to fix the same against longitudinal movement transversely of the bone pierced thereby, means to secure said bone piercing rods in adjusted positions relative to the carrier rods, the carrier and bone piercing rods of each assembly being in the same plane, and secondary transverse bone piercing rods mounted at corresponding ends between the first named bone piercing rods and on one carrier rod of each unit, said secondary bone piercing rods being adjustable longitudinally and transversely of the associated carrier rod and engageable at their other ends in sections of a second broken bone disposed beside the first-named broken bone.

ROY PERSALL.

REFERENCES CITED

The following references are of record in the file of this patent:

UNITED STATES PATENTS

| Number | Name | Date |
|---|---|---|
| 1,869,726 | Youngren | Aug. 2, 1932 |
| 2,250,417 | Ettinger | July 22, 1941 |
| 2,346,346 | Anderson | Apr. 11, 1944 |

FOREIGN PATENTS

| Number | Country | Date |
|---|---|---|
| 789,882 | France | Nov. 7, 1935 |

OTHER REFERENCES

"Knochenbruchbehandlung Mit Drahtzugen," a book by Klapplblock and published by Urban & Schwarzenberg of Friedrichstrasse 105 B, Berlin N 24, Germany in 1930, page 49. (Copy in Division 55.)